Dec. 9, 1958     J. P. GITS     2,863,241
MOLDED ARTICLES AND METHODS OF MAKING SAME
Filed June 21, 1957
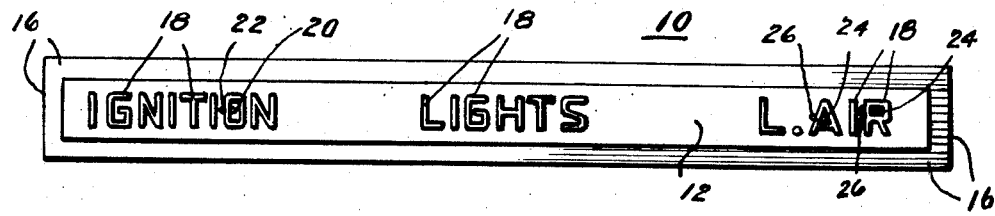
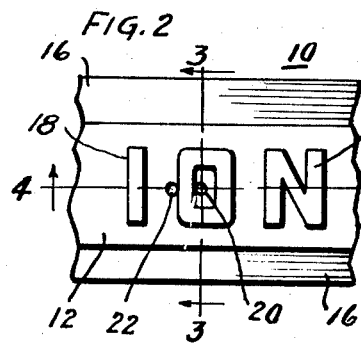
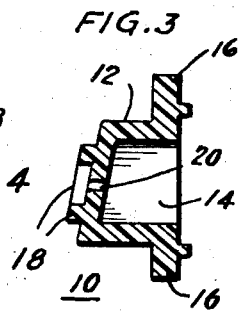
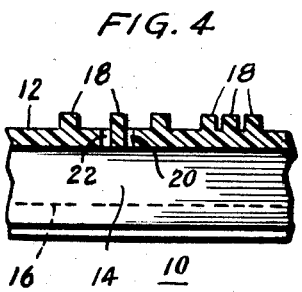
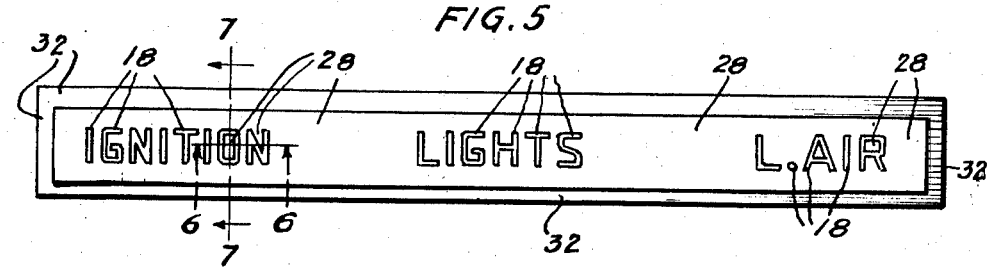
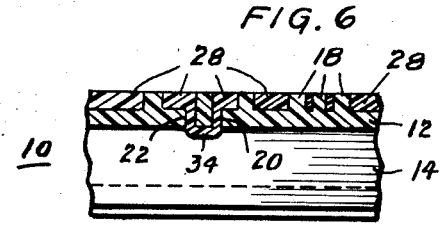
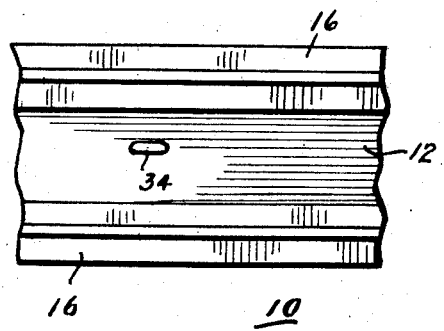
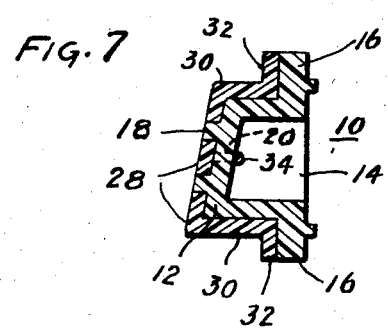
INVENTOR
JULES P. GITS
BY Ray Eiler ATT'Y.

United States Patent Office

2,863,241
Patented Dec. 9, 1958

2,863,241

MOLDED ARTICLES AND METHODS OF MAKING SAME

Jules P. Gits, River Forest, Ill., assignor of one-half to Joseph A. Gits, River Forest, Ill.

Application June 21, 1957, Serial No. 667,078

8 Claims. (Cl. 40—136)

This invention relates to improvements in molded articles and methods of making same. More particularly, this invention relates to improvements in molded, indicia-bearing articles and in methods of making same.

It is therefore an object of the present invention to provide an improved molded, indicia-bearing article and to provide an improved method of making such article.

It is frequently desirable to provide molded articles that have differently colored areas to define indicia; and in recognition of this fact, a number of such articles have been proposed. Those articles usually have light-colored areas and dark-colored areas. In some instances, those articles are mounted in front of sources of illumination; and light from those sources is intended to pass through the light-colored areas of those articles. To be effective and attractive, those articles should be formed so the light-colored areas thereof are substantially free of shadows. The light-colored areas are frequently given the configuration of numerals or letters; and where those areas are open in nature, it is relatively easy to make those areas substantially shadow-free. Thus, where the light-colored areas have the configuration of the numerals 1, 2, 3, 5 or 7, or have the configuration of the letters C, E, F, G, H, I, J, K, L, M, N, S, T, U, V, W, X, Y or Z, it is relatively easy to make those areas substantially shadow-free. However, where the light-colored areas are given the configuration of numerals or letters that are closed in nature, it is not easy to make those areas substantially shadow-free. Thus, where the light-colored areas have the configuration of the numerals 4, 6, 8, 9 or 0, or have the configuration of the letters A, B, D, O, P, Q or R, it is not easy to make those areas substantially shadow-free.

In molding indicia-bearing articles it is customary to form a first part and then to apply a second part to the first part. The first part can be provided with recesses that define the indicia, or it can be made so the indicia are in half relief. Where the indicia are defined by recesses in a dark-colored first part, the wholly enclosed areas or islands of the indicia must be supported and held by struts, and those struts will be dark-colored and can cast heavy shadows on portions of the light-colored areas in those recesses when the molded articles are trans-illuminated. For example, where the first part is of dark-colored material and is formed to define a recess bounding the outer periphery of an O, the island for the O must be held in place by struts; and those struts will be of the same dark-colored material of which the rest of the first part is formed. Consequently, when the light-colored material is disposed in the space defined by the said recess and the said island, and when a source of illumination is disposed behind the molded article, the struts of the first part can cast heavy shadows on portions of the light-colored area of the indicia. Where the indicia are made in half relief as part of a light-colored first part, slots or grooves are usually formed in the face of that first part, and those slots or grooves abut the rear portions of the indicia and also open to the front surface of the first part, both at points external of the indicia and within the wholly enclosed areas of the indicia. Those slots or grooves permit the molten material of the second part, that will harden to form the dark-colored areas, to pass into and fill the wholly enclosed areas of the indicia; and that material will abut and underlie rear portions of the light-colored areas of the indicia and will, when the article is trans-illuminated, cast a heavy shadow upon those portions of the light-colored areas of the indicia.

The present invention makes it possible to form molded, indicia-bearing articles that have closed indicia and that are substantially shadow-free. In doing so, the present invention provides molded, indicia-bearing articles that can be mounted adjacent to, and forwardly of, sources of illumination to provide an improved and pleasing display of the indicia. It is therefore an object of the present invention to provide a molded, indicia-bearing article that has closed substantially shadow-free indicia.

In making the molded, indicia-bearing article provided by the present invention, the first part is made with a relatively thick, substantially continuous face that has the indicia formed thereon in half relief and that has openings which extend from the front surface to the rear surface of that face and which are adjacent the opposite sides of part of a closed indicia. Those openings will be placed in register with a groove in the mold in which the second part is applied to the first part, and the material of the second part can pass rearwardly through one of those openings, pass through the groove in the mold to form a runner, and then pass forwardly into and fill the island of the closed indicia. The first part will be made of light-colored plastic material which can readily diffuse light that passes through it, and the relatively thick, substantially continuous face of that first part will space the runner rearwardly of the rear portions of the indicia. The groove in the mold, in which the second part is applied to the first part, is both narrow and shallow, and consequently the runner formed in that groove will be both narrow and shallow and can not obstruct much light. When the finished article is mounted in front of a source of illumination, the spacing of the runner rearwardly of the rear portions of the indicia of the first part, by the face of that first part, will coact with the narrow and shallow nature of the runner and with the light diffusing nature of the face, to enable the light that passes by the sides of the runner to diffuse into, and illumine, the narrow area of the face and of the indicia underlain by the narrow and shallow runner. As a result, the indicia of the completed article is substantially shadow-free despite its trans-illumination. It is therefore an object of the present invention to provide a molded indicia-bearing article that has a face which spaces a narrow and shallow runner of dark-colored material from the rear portions of light-colored indicia.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

In the drawing,

Fig. 1 is a front elevational view of a relatively thick first part that is formed of a light-colored material which has the ability to diffuse light, Fig. 2 is an enlarged, front elevational view of a portion of the first part of Fig. 1, Fig. 3 is an enlarged, sectional view of the first part of Fig. 1, and it is taken along the plane indicated by the line 3—3 in Fig. 2, Fig. 4 is an enlarged, sectional view of the first part of Fig. 1, and it is taken along the plane indicated by the line 4—4 in Fig. 2, Fig. 5 is a front elevational view of the finished molded article, Fig. 6 is an enlarged, sectional view of the finished molded article of Fig. 5, and it is taken along the plane indicated by the line 6—6 in Fig. 5, Fig. 7 is an enlarged, sectional view of the finished molded article of Fig. 5 and it is taken along the plane indicated by the line 7—7 in Fig. 5, and Fig. 8 is an enlarged, rear view of a portion of the finished article of Fig. 5.

Referring to the drawing in detail, the numeral 10 generally denotes the molded first part of an indicia-bearing article. That first part is made relatively thick, and it is made of a plastic material that readily difuses any light that passes through it. That material will be light in color, and it will be translucent rather than transparent. The first part 10 has an elongated, generally flat face 12 which is disposed at an angle, as emphasized particularly in Fig. 3. Rearwardly extending walls and ends 14 are formed integrally with the face 12, and those walls are generally parallel to each other and those ends are generally parallel to each other. Outwardly extending flanges 16 are formed integrally with the rearwardly extending walls and ends 14, and those flanges will underlie the portions of a panel or dashboard that define the opening in which the finished molded article is to be set. Suitable clamps or supports will engage the rear surfaces of the flanges 16 to hold the finished molded article in position in the opening in the panel or dashboard.

The numeral 18 denotes indicia that are formed integrally with the face 12 and that are formed in half relief. Those indicia extend forwardly from the face 12; and in the particular modification shown by the drawing, the indicia constitute letters that spell out the words Ignition, Lights, and L. Air. Most of the letters are open letters, but the O, the A and the R are closed letters. As a result, while the dark-colored material of the second part can be applied to the front surface of thef ace 12 to flow into engagement with and to bond to the rearwardly extending walls and ends 14, the flanges 16, the exposed front surface of the face 12, the outer peripheries of the closed indicia, and the entire peripheries of the open indicia, that dark-colored material of the second part can not directly enter the islands of the O, the A and the R.

To make it possible for the dark-colored material of the second part to enter and fill the island in the O, an opening 20 and an opening 22 are formed in the face 12 of the first part. Both openings extend all the way from the front surface to the rear surface of the face 12, as emphasized particularly by Fig. 4; and the opening 20 opens into the island of the O while the opening 22 is immediately external of the O.

A narrow and shallow groove will be formed in the core of the mold which will receive the first part and will hold the first part as the second part is applied to it; and that groove will be in register with the openings 20 and 22, thereby placing those openings in communication with each other. Openings 24 are provided in the face 12 that open into closed areas of the A and the R, and those openings are similar to the opening 20; and openings 26 are provided in the face 12 at points immediately external of the A and the R, and those openings are similar to the opening 22. The core of the mold will have shallow and narrow grooves adjacent to and in register with the openings 24 and 26, and those grooves will place each opening 24 in communication with its corresponding opening 26. As a result, the application of the dark-colored material of the second part to the front surface of the face 12 will enable part of that material to surround the O, the A and the R, to pass rearwardly through the openings 22 and 26, to pass through the narrow and shallow grooves in the core of the mold, and then to pass forwardly through the openings 20 and 24 into the islands defined by the O, the A and the R. That part of the dark-colored material will then harden to fill the islands of the O, the A and the R, to surround the O, the A and the R, and to form narrow and shallow runners 34 at the rear surface of the face 12. The runners are quite narrow and shallow, as indicated particularly in Figs. 6–8, and they will not obstruct an appreciable amount of any light that is directed onto the rear of the finishd molded article.

The finished molded article will have a smooth and plane front surface 28 which has the indicia 18 as part thereof, all as indicated particularly in Figs. 6 and 7. The second part of the finished molded article will have rearwardly extending walls and ends 30, and it will have outwardly extending flanges 32. The surface 28, the walls and ends 30 and the flanges 32 will overlie, and substantially prevent the passage of light through, the greater portions of the first part. However, the dark-colored material of the second part will not overlie or underlie any part of the open indicia of the first part, and it will not overlie any of the close indicia of that first part. The only portions of the dark-colored material of the second part that will underlie the indicia 18 of the first part will be the narrow and shallow runners 34.

As indicated particularly in Figs. 6 and 7, the thickness of each of the runners 34 is less than one half of the thickness of the face 12 of the first part. Moreover, each runner is bodily spaced rearwardly of the rear portions of the indicia 18 by the interposed face 12. Consequently, when light is directed onto the rear of the finished molded article, the light which passes by the sides of the runners 34 will diffuse into and illumine those portions of the face 12 and those portions of the O, the A and the R which are underlain by the runners 34. The overall result is that the indicia of the finished molded article are substantially shadow-free.

Whereas the drawing and accompanying description have shown and described a preferred embodiment of the present invention, it should be apparent to those skilled in the art that various changes may be made in the form of the invention without affecting the scope thereof.

What I claim is:

1. An indicia-bearing molded article that includes a support of light-colored material providing a high degree of light diffusion, said support having indicia thereon which extend forwardly from said support, at least one of said indicia being closed, a mass of dark-colored material bonded to and overlying the front of said support, said mass of dark-colored material engaging and being bonded to the peripheries of any open indicia and to the outer periphery of said closed indicia, said mass of dark-colored material filling the island of said closed indicia, a runner of said dark-colored material that abuts the rear of said support and that underlies a part of said closed indicia, and portions of said dark-colored material that connect said runner with those portions of said mass of dark-colored material that fill the island of said closed indicia and that surround said closed indicia, said support spacing said runner rearwardly from the plane of the rear faces of the indicia, said runner having a thickness that is less than one half the thickness of said support, said runner being shallow.

2. An indicia-bearing molded article that includes a support of light-colored material, said support having indicia thereon which extend forwardly from said support, at least one of said indicia being closed, a mass of dark-colored material bonded to and overlying the front of said support, said mas of dark-colored material engaging and being bonded to the peripheries of any open indicia and to the outer periphery of said closed indicia, said mass of dark-colored material filling the island of said closed indicia, a runner of said dark-colored material that abuts the rear of said support and that underlies a part of said closed indicia, and portions of said dark-colored material that connect said runner with those portions of said mass of dark-colored material that fill the island of said closed indicia and that surround said closed indicia, said support spacing said runner rearwardly from the rear faces of the indicia, said runner being shallow.

3. An indicia-bearing molded article that includes a support of light-colored material, said support having indicia thereon which extend forwardly from said support, at least one of said indicia being closed, a mass of dark-colored material bonded to and overlying the front of said support, said mass of dark-colored material engaging and being bonded to the peripheries of any open indicia and to the outer periphery of said closed indicia, said mass of dark-colored material filling the island of said closed indicia, a runner of said dark-colored material that abuts the rear of said support and that underlies a part of said closed indicia, and portions of said dark-colored material that connect said runner with those portions of said mass of dark-colored material that fill the island of said closed indicia and that surround said closed indicia, said support spacing said runner rearwardly from the rear faces of the indicia, said runner being narrow and said runner being shallow, said support diffusing light that passes forwardly by the sides of said runner to illumine the underlain part of said closed indicia.

4. An indicia-bearing molded article that includes an indicia-defining first part that defines at least one closed indicia, said first part being of light-colored material providing a high degree of light diffusion, a second part of dark-colored material coacting with said first part to accentuate and highlight said indicia, and a runner of said dark-colored material at the rear of said first part to underlie part of said first part and to place the island of said closed indicia in communication with the area immediately external of said closed indicia, said runner having a thickness less than one half the thickness of said first part whereby light passing forwardly by the opposite sides of said runner can diffuse into said first part and illumine the underlain part of said first part.

5. An indicia-bearing molded article that includes an indicia-defining first part that defines at least one closed indicia, said first part being of light-colored material, a second part of dark-colored material coacting with said first part to accentuate and highlight said indicia, and a runner of said dark-colored material at the rear of said first part to underlie part of said first part and to place the island of said closed indicia in communication with the area immediately external of said closed indicia, said runner being narrow whereby light passing forwardly by the opposite sides of said runner can diffuse into said first part and illumine the underlain part of said first part and thereby render said article substantially shadow-free.

6. An indicia-bearing molded article that includes an indicia-defining support with at least one closed indicia, a mass of material of contrasting color that sets off and highlights said indicia, said mass of material extending rearwardly through an opening in said support external of said closed indicia and extending behind and underlying a part of said closed indicia and extending forwardly to fill the island of said closed indicia, said support being of light-diffusing material and being thick, whereby light passing forwardly by the sides of the underlying portion of said mass of material can diffuse into said support and into said closed indicia and render said closed indicia substantially free of shadows.

7. A molded indicia-defining article that has at least one closed indicia, that has a runner extending from a point in register with an island of said indicia to a point external of said closed indicia, and a support that is interposed between the rear portions of said indicia and the said runner to isolate the said runner from said rear portions of said indicia and thereby permit light passing forwardly by the sides of the said runner to diffuse into said support to illumine the said closed indicia.

8. A molded indicia-defining article that has at least one closed indicia, that has a runner extending from a point in register with an island of said indicia to a point external of said closed indicia, and a support that is interposed between the rear portions of said indicia and the said runner to isolate the said runner from said rear portions of said indicia and thereby permit light passing forwardly by the sides of the said runner to diffuse into said support to illumine the said closed indicia, said support being of light-colored material having the property of diffusing light, said runner being of dark-colored material, said runner being narrow.

References Cited in the file of this patent

UNITED STATES PATENTS

| 2,607,957 | Danielson et al. | Aug. 26, 1952 |
| 2,720,681 | Danielson et al. | Oct. 18, 1955 |